United States Patent Office 3,557,213
Patented Jan. 19, 1971

3,557,213
PROCESS FOR THE PREPARATION OF PHENYL-
TRICHLOROACETOIMIDOCHLORIDES
Hans-Georg Schmelzer, Cologne-Stammheim, Eberhart
Degener, Horst Tarnow, and Hans Holtschmidt, Leverkusen, Gunter Unterstenhofer, Opladen, and Wilfried
Zecher, Cologne-Stammheim, Germany, assignors to
Farbenfabriken Bayer Aktiengesellschaft, Leverkusen,
Germany, a corporation of Germany
No Drawing. Filed Oct. 25, 1967, Ser. No. 677,877
Claims priority, application Germany, Oct. 28, 1966,
F 50,560
Int. Cl. C07c *119/00*
U.S. Cl. 260—566            15 Claims

ABSTRACT OF THE DISCLOSURE

Reacting N-(2,2,2-trichloro-ethylidene)-(fluoro, chloro, bromo and/or trifluoromethyl and optionally alkyl and/or cyano)-substituted anilines with chlorine at elevated temperatures of, for example, about 80–250° C., optionally in the presence of a chlorination catalyst such as, for example, a Lewis acid, to form the corresponding (fluoro, chloro, bromo and/or trifluoromethyl and optionally alkyl, chloroalkyl and/or cyano)-substituted phenyl - trichloroacetoimidochlorides or N-(1,2,2,2-tetrachloro-ethylidene)-(fluoro, chloro, bromo and/or trifluoromethyl and optionally alkyl, chloroalkyl and/or cyano)-substituted anilines, some of which are known and which possess acaricidal properties.

---

The present invention relates to and has for its objects the provision for particular new methods of producing phenyl - trichloroacetoimidochlorides or N-(1,2,2,2-tetrachloroethylidene)-anilines, and more particularly (fluoro, chloro, bromo and/or trifluoromethyl and optionally alkyl, chloroalkyl and/or cyano)-substituted phenyl-trichloroacetoimidochlorides or N-(1,2,2,2-tetrachloro-ethylidene)-(fluoro, chloro, bromo and/or trifluoromethyl and optionally alkyl, chloroalkyl and/or cyano)-substituted anilines, some of which are known and which possess acaricidal properties, e.g., in a simple single step reaction, using readily available starting materials whereby to attain outstanding yields, with other and further objects of the invention becoming apparent from a study of the within specification and accompanying examples.

It is known that pentachlorophenyl-trichloroacetoimidochloride or N - (1,2,2,2-tetrachloro - ethylidene) - pentachloro-aniline (IIIa) is obtained when N-ethyl-N-phenyl-carbamic acid chloride is perchlorinated in the presence of a halogen carrier. This process, however, exhibits a number of disadvantages. The perchlorination of the phenyl radical and of the ethyl radical in the N-ethyl-N-phenyl-carbamic acid chloride requires very long chlorination times and high temperatures as well as a large excess of chlorine. At the same time, corrosion problems arise. For this reason, the process is not very economical. Moreever, in this known perchlorination process, phosgene is split off, whereby the volume yield of the process is reduced. Also, the phosgene produced has to be separated from the excess chlorine used.

It is also known that the adducts of chloral and anilines, for example N-(2,2,2-trichloro-1-hydroxy-ethyl) - aniline of the formula

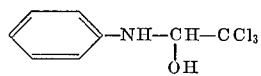

(A)

are unstable and decompose at elevated temperatures and therefore cannot be chlorinated in the contemplated way.

It is furthermore established that if chlorination of methylbenzaldimine of the formula

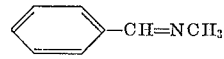

(B)

is attempted, polymerization occurs even at the beginning of the reaction.

Of the possible Schiff bases from chloral and anilines, only N-(2,2,2-trichloro-ethylidene)-aniline (IIaa) has already become known. No indications regarding its chlorination or its behavior during chlorination have been available in the literature up to now.

It has now been found, in accordance with the present invention, that phenyl-trichloroacetoimidochlorides or N-(1,2,2,2 - tetrachloro - ethylidene) - anilines, i.e., (fluoro, chloro, bromo and/or trifluoromethyl and optionally alkyl, chloroalkyl and/or cyano)-substituted phenyl-trichloroacetoimidochlorides or N-(1,2,2,2-tetrachloro-ethylidene)-(fluoro, chloro, bromo and/or trifluoromethyl and optionally alkyl, chloroalkyl and/or cyano)-substituted anilines, some of which are known and which possess acaricidal properties, having the formula

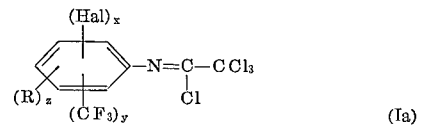

(Ia)

in which each Hal respectively is selected from the group consisting of chloro, bromo and fluoro, each R respectively is selected from the group consisting of lower alkyl, chloro-substituted lower alkyl and cyano, $x$ is a whole number from 0 to 5, $y$ is a whole number from 0 to 2, and $z$ is a whole number from 0 to 2, with the proviso that the sum of $x$ and $y$ is at least 1 and at most 5 and that the sum of $x$, $y$ and $z$ is at most 5, can be obtained much more simply, that is in a one-step reaction, in high purity and with outstanding, practically quantitative, yields, by the process which comprises reacting N - (2,2,2 - trichloro-ethylidene)-anilines having the general formula

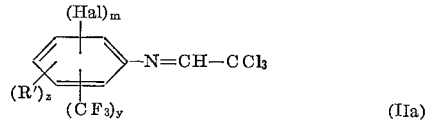

(IIa)

in which Hal, $y$ and $z$ are the same as defined above, each R' respectively is correspondingly selected from the group consisting of lower alkyl and cyano, and $m$ is a whole number from 0 to 5 at most equal to $x$, with the further proviso that the sum of $m$ and $y$ is correspondingly at least 1 and at most 5 and that the sum of $m$, $y$, and $z$ is correspondingly at most 5, with chlorine, at a temperature substantially between about 80 to 250° C., if desired, in the presence of an inert organic solvent or diluent, and optionally in the presence of a chlorination catalyst.

In this chlorination, in accordance with the process of the present invention, the hydrogen atom in the trichloroethylidene side-chain is replaced by chlorine. In addition, hydrogen atoms in the phenyl radical and hydrogen atoms in the alkyl group, if R' is lower alkyl, may be replaced by chlorine.

It is very surprising that the chlorination carried out according to the present invention proceeds smoothly and leads to clearly defined chlorination products, because in view of the aforementioned prior art it would have to have been assumed that either the starting products would decompose or polymers would form. In this regard, substances which are chemically more closely related to the anilines of Formula IIa, which are used as starting materials according to the present invention, than the substances (A) and (B) referred to specifically in the above discussion of the prior art have not yet been chlorinated.

If the chlorination process of the present invention is compared with the already known perchlorination process for the preparation of pentachlorophenyl-trichloroacetoimidochloride (IIIa), it can readily be seen that the process of the present invention represents a technological advance, for it exhibits a number of advantages. The protracted chlorination of the ethyl radical in the N-ethyl-N-phenylcarbamic acid chloride is not necessary in accordance with the instant invention. In the starting materials for the present process, this radical is already chlorinated except for a hydrogen atom. Moreover, in the present process the splitting off of phosgene does not arise. At the same time the protracted and costly perchlorination of the phenyl nucleus is avoided. (This costly perchlorination can be avoided in the previously known process by using N-ethylpentachloroaniline to start with, but the latter compound is technologically more difficult to obtain than N-(2,2,2-trichloroethylidene)-pentachloroaniline (IIab), which may be used as starting material in accordance with the process of the present invention.)

A main advantage of the process of the instant invention is that there can be prepared in particularly simple manner phenyl-trichloroacetoimidochlorides which are quite specifically substituted in the phenyl radical.

With the relatively short chlorination times in accordance with the process of the present invention, corrosion problems hardly arise. Moreover, it is not necessary to recover large amounts of excess chlorine and purify the same from attendant phosgene.

The course of the process of the present invention can be represented, for example, by the following formula scheme:

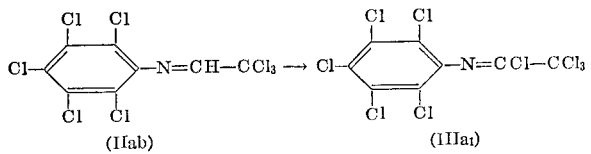

The anilines usable as starting materials for the instant process are clearly characterized by the above Formula IIa. In this formula, Hal represents in particular chlorine and R' represents in particular methyl, $m$ stands preferably for 1 to 5, $y$ for 0, 1 or 2, and $z$ for 0 or 1.

As typical examples of the derivatives of N-(2,2,2-trichloro-ethylidene)-aniline which can be used as starting materials according to the present invention, the following may be listed:

N-(2',2',2'-trichloro-ethylidene)-2-, 3- and 4-chloro-aniline,

N-(2',2',2'-trichloro-ethylidene)-2,3-, 2,4-, 2,6-, 3,4- and 3,5-dichloro-aniline, N-(2',2',2'-trichloro-ethylidene)-2,3,4-, 2,3,5-, 2,3,6-, 2,4,5-, 2,4,6- and 3,4,5-trichloro-aniline N-(2',2',2'-trichloro-ethylidene)-2,3,5,6-, 2,3,4,6-, and 2,3,4,5-tetrachloro-aniline, N-(2',2',2'-trichloro-ethylidene)-pentachloro-aniline, N-(2',2',2'-trichloro-ethylidene)-2,4- and 3,4-difluoro-aniline, N-(2',2',2'-trichloro-ethylidene)-2-chloro-5-fluoro-aniline, N-(2',2',2'-trichloro-ethylidene)-2,4,6-trifluoro-aniline, N-(2',2',2'-trichloro-ethylidene)-3,5-dichloro-4-fluoro-aniline, N-(2',2',2'-trichloro-ethylidene)-2,3,5,6-tetrachloro-4-fluoro-aniline, N-(2',2',2'-trichloro-ethylidene)-2-fluoro-4-bromo-aniline, N-(2',2',2'-trichloro-ethylidene)-2,4,6-trimethyl-3-fluoro-aniline, N-(2',2',2'-trichloro-ethylidene)-2-methyl-3-chloro, 2-methyl-4-chloro-, 2-methyl-5-chloro- and 2-methyl-6-chloro-aniline, N-(2',2',2'-trichloro-ethylidene)-3-methyl-4-chloro-aniline, N-(2',2',2'-trichloro-ethylidene)-3-methyl-6-chloro-aniline, N-(2',2',2'-trichloro-ethylidene)-4-methyl-2-chloro-aniline, N-(2',2',2'-trichloro-ethylidene)-2,4-dichloro-5-methyl-aniline, N-(2',2',2'-trichloro-ethylidene)-3-bromo-aniline, N-(2',2',2'-trichloro-ethylidene)-4-bromo-aniline, N-(2',2',2'-trichloro-ethylidene)-2,4,6-tribromo-aniline, N-(2,2',2'-trichloro-ethylidene)-2-methyl-5-bromo-aniline, N-(2',2',2'-trichloro-ethylidene)-2,4-dimethyl-6-bromo-aniline, N-(2',2',2'-trichloro-ethylidene)-2,6-dibromo-4-methyl-aniline, N-(2',2',2'-trichloro-ethylidene)-2,4-dibromo-6-methyl-aniline, N-(2',2',2'-trichloro-ethylidene)-2,4-dibromo-6-chloro-aniline, N-(2',2',2'-trichloro-ethylidene)-2,6-dibromo-4-chloro-aniline, N-(2',2',2'-trichloro-ethylidene)-3,5-bis-(trifluoromethyl)-aniline, N-(2',2',2'-trichloro-ethylidene)-2-trifluoromethyl-4-chloro-aniline, N-(2',2',2'-trichloro-ethylidene)-3-trifluoromethyl-6-chloro-aniline, N-(2',2',2'-trichloro-ethylidene)-2-trifluoromethyl-4-cyano-aniline, N-(2',2',2'-trichloro-ethylidene)-2,6-dichloro-4-cyano-aniline, N-(2',2',2'-trichloro-ethylidene)-2,3,5,6-tetrachloro-4-cyano-aniline, N-(2',2',2'-trichloro-ethylidene)-3-bromo-4-tert.-butyl-aniline, N-(2',2',2'-trichloro-ethylidene)-2,3,5-trichloro-4,6-dicyano-aniline.

The anilines of Formula IIa above have not yet become known. They can, however, be prepared in simple manner in accordance with the disclosed subject matter in copending U.S. application Ser. No. 677,878, filed Oct. 25, 1967, by reaction of suitably subtituted sulfinylanilines with chloral, for example at temperatures between about 50 to 200° C., whereby sulfur dioxide is split off, the work being carried out with at least one mol of chloral per mol of the sulfiinylaniline optionally in the presence of a solvent, and optionally in the presence of a catalyst of the Lewis acid type in an amount based on the reaction mixture of about 0.01 to 5% by weight.

A particularly expedient method of preparation of the corresponding nanilines of Formula IIa above consists in boiling under reflux about 1 mol of the appropriate sulfinylaniline with about double the molar amount of anhydrous chloral until the cessation of evolution of sulfurdioxide. The excess chloral which serves as solvent, is distilled off. The crude product which remains behind is, in general, crystallized out. If this is not the case, it is subject to a fractional distillation for purification.

The reaction in accordance with the present invention is preferably carried out in the absence of solvents since the presence of solvents is not of decisive importance for the success of the reaction, although solvents (including diluents) can be used. As such, all organic solvents or diluents are suitable which are inert under the reaction conditions and are not chlorinated. These include, in particular, chlorinated hydrocarbons, especially chlorinated aliphatic and chlorinated aromatic hydrocarbons and mixtures thereof, such as carbon tetrachloride, 1,1, 2,2-tetrachloroethane, o-dichlorobenzene, 1,2,4-trichlorobenzene, pentachloropropane and octachlorocyclopentene, and the like.

The process of the present invention is, in general, carried out in the absence of auxiliary substances. For chlorination of the azomethine group present in the starting material no catalysts are required. Where the additional chlorination of the benzene nucleus of the N-(2,2,2-trichloro-ethylidene)-anilines is desired, it is, however, advantageous to use Lewis acids or iodine as chlorination catalysts, for example iron (III) chloride, anhydrous aluminum chloride, boron trifluoride or antimony trichloride. Thus, when such catalysts are used, the chlorination of the nucleus can be accelerated.

The reaction temperatures for carrying out the instant chlorination process can be varied within a fairly wide range. They are groverned in particular by the degree of chlorination which, beyond the chlorination of the azomethine group, is additionally desired for a still substitutable benzene nucleus or (as may possibly be present) alkyl radicals of the starting anilines. In general, the work is carried out substantially between about 80 and 250° C., and for example in such a manner that, commencing at a temperature above the melting point of the starting aniline, chlorine is introduced and the temperature is increased during the course of the chlorination until the desired temperature is reached.

When the chlorination process of the present invention is carried out, generally the starting material is heated until it melts nad chlorine is then introduced. The catalyst which are possibly to the added are added in amounts of between about 0.01 to 5%, by weight based on the starting material, either at the beginning of the chlorination or in the course of the chlorination, expediently after completion of the chlorination of the azomethine group.

Working up may take place in the usual manner. Excess chlorine may be removed by passing nitrogen through the mixture. In this way the crude product is obtained directly in good yield and with a high degree of purity.

Advantageously, the new phenyl-trichloroacetoimidochlorides or N - (1,2,2,2-tetrachloro-ethylidene)-anilines obtainable according to the process of the present invention exhibit significant acaricidal properties, like the already known pentachlorophenyl-trichloroacetoimidochloride (IIIa) as taught in German Published Pat. No. 1,197,087. However, the acaricidal properties of the new compounds produced in accordance with the present invention are not so pronounced as in the case of the pentachlorophenyl derivative.

Thus, the products obtainable by the process of the present invention can be used to advantage as acaricidally active compounds for the control of acarids, such as spider mites, blister mites and ticks, especially since the instantly obtained active compounds show only a very slight phytotoxicity.

In this regard, the present invention also provides new phenyl-trichloroacetoimidochlorides of general Formula Ia above in which x is 0, 1, 2, 3 or 4 when Hal is chlorine.

The instant invention also contemplates acaricidal compositions containing as active ingredient a compound of Formula Ia, produced by the chlorination process of the invention and particularly those covered in the immediately preceding paragraph, in admixture with a solid diluent or carrier or in admixture with a liquid diluent or carrier preferably containing a surface-active agent. The carrier vehicle composition generally contains from 0.1 to 95% of the active compound by weight. The instant invention also contemplates methods of combatting acarids which comprise applying to the acarids and/or their habitat a compound of Formula Ia, produced by the chlorination process of the invention and particularly those covered in the immediately preceding paragraph, either alone or in the form of a composition containing as active ingredient the compound in admixture with a solid or liquid diluent or carrier.

In accordance with a specific feature of the persent invention, in the above composition and methods, the preferred compound is pentachloro-phenyl-trichloroacetoimidochloride.

The particular new chlorination process of the present invention is illustrated without limitation by the following production examples:

EXAMPLE 1

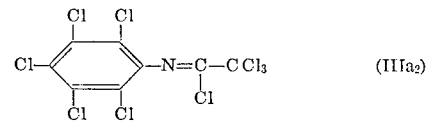

Chlorine is introduced, commencing at 100° C., into a melt of 118.5 g. (0.3 mol) of N-(2',2',2'-trichloro-ethylidene)-pentachloro-aniline (M.P. 94–95° C.). In the course of an hour the temperature of the melt is increased to 180° C. and chlorination is continued for two hours at this temperature. To remove residual amounts of chlorine and hydrogen chloride which form, flushing with nitrogen is then effected for a short time. The product has taken up the theoretical amount of chlorine and solidifies at 131–133° C. It is a very pure pentachloro-phenyl-trichloroacetoimidochloride or N - (1,2,2,2 - tetrachloro-ethylidene)-pentachloro-aniline.

EXAMPLE 2

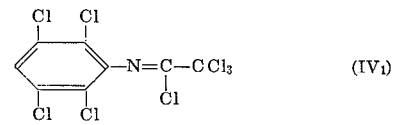

Chlorine is introduced for one hour at 180° C., and then for one hour at 200° C. into a melt of 108.2 g. (0.3 mol) of N - (2',2',2' - trichloro-ethylidene-2,3,5,6-tetrachloro-aniline (M.P. 86° C.). 2,3,5,6-tetrachloro-phenyl-trichloroacetoimidochloride or N - (1',2',2',2'-tetrachloro-ethylidene)-2,3,5,6-tetrachloro-aniline of M.P. 130° C. is obtained in practically quantitative yield. When 0.5% of iron (III) chloride is added to the 2,3,5,6-tetrachloro-phenyl-trichloroacetoimidochloride and the chlorination is continued for a further hour at 200° C., pentachloro-phenyl-trichloroacetoimidochloride (see Example 1) is obtained, likewise in practically quantitative yield.

EXAMPLE 3

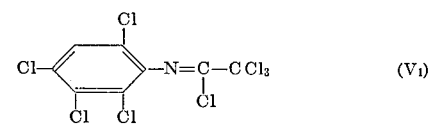

When 108.2 g. (0.3 mol) of N-(2',2',2'-trichloro-ethylidene)-2,3,4,6-tetrachloro-aniline (M.P. 83° C.) are chlorinated under the conditions described in Example 1, there is obtained a liquid chlorination product which is purified by distillation. At 180° C./0.5 mm. Hg, 2,3,4,6-tetrachloro-phenyl-trichloroacetoimidochloride or N - (1',2',2',2'-tetrachloro-ethylidene)-2,3,4,6-tetrachloro aniline is obtained in almost quantitative yield as pale yellow oil of refractive index $n_D^{20} = 1.6043$.

EXAMPLE 4

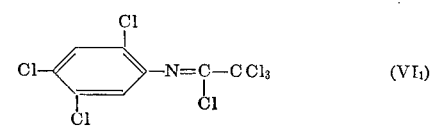

21.3 g. chlorine are introduced during two hours at 180° C. into a melt of 97.8 g. (0.3 mol) of N-(2',2',2'-trichloroethylidene)-2,4,5-trichloro-aniline (M.P. 159–161° C./0.2 mm. Hg). The chlorination product is then distilled. At 126° C./0.8 mm. Hg, 97 g. 2,4,5-trichloro-phenyl-trichloroacetoimidochloride or N-(1',2',2',2'-tetrachloro-ethylidene)-2,4,5-trichloro-aniline are obtained as yellow oil of refractive index $n_D^{20} = 1.6035$.

The aniline used as starting material can be obtained in the following manner:

121 g. of 2,4,5-trichloro-sulfinylaniline and 150 g. of anhydrous chloral are boiled under reflux until the cessation of evolution of sulfur dioxide. The residue remaining after the excess chloral has been distilled off is fractionated in a vacuum. At 159–161° C./0.2 mm. Hg, 132 g. of N-(2',2',2'-trichloroethylidene)-2,4,5-trichloro-aniline come over as a yellow oil.

EXAMPLE 5

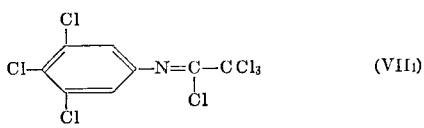
(VII₁)

Chlorination of N-(2',2',2'-trichloro-ethylidene) - 3,5-dichloro-aniline (B.P. 158° C./1.0 mm. Hg) for three hours at 200° C. yields 3,4,5-trichloro-phenyl-trichloro-acetomidochloride or N - (1',2',2',2' - tetrachloro-ethylidene)-3,4,5-trichloro-aniline as yellow oil of B.P. 155° C./0.25 mm. Hg and refractive index $n_D^{20}$: 1.6068. Yield: 78% of the theory.

EXAMPLE 6

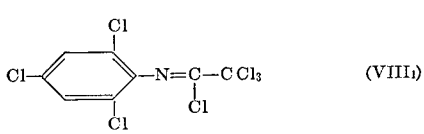
(VIII₁)

Chlorination of N-(2',2',2'-trichloro-ethylidene)-2,4,6-trichloro-aniline for three hours at 200° C. yields 2,4,6-trichloro-phenyl-trichloroacetoimidochloride or N-(1',2',-2',2'-tetrachloro-ethylidene)-2,4,6-trichloro-aniline as yellow oil of B.P. 110° C./0.1 mm. Hg and refractive index $n_D^{20}$: 1.5920. Yield: 85% of the theory.

EXAMPLE 7

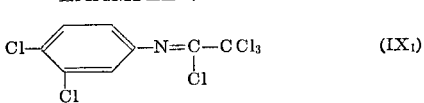
(IX₁)

Chlorination of N-(2',2',2'-trichloro-ethylidene) - 3,4-dichloro-aniline for three hours at 200° C. yields 3,4-dichloro-phenyl-trichloroacetoimidochloride or N-(1',2',2',2' - tetrachloroethylidene)-3,4-dichloro-aniline as yellow oil of B.P. 119° C./0.1 mm. Hg and refractive index $n_D^{20}$: 1.6039. Yeild: 83% of the theory.

EXAMPLE 8

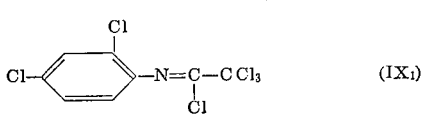
(IX₁)

Chlorination of N-(2',2',2'-trichloro-ethylidene)-4-chloro-aniline for three hours at 200° C. yields 2,4-dichloro-phenyl-trichloroacetoimidochloride or N-(1'-2',2',2'-tetrachloroethylidene)-(2,4-dichloro-aniline as yellow oil of B.P. 109° C./0.1 mm. Hg and refractive index $n_D^{20}$: 1.5930. Yield: 71% of the theory.

EXAMPLE 9

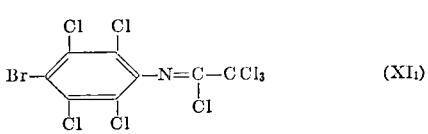
(XI₁)

Chlorination of N-(2',2',2' - trichloro - ethylidene)-4-bromo-2,3,5,6-tetrachloro-aniline for three hours at 200° C. yields 4 - bromo-2,3,5,6-tetrachloro-phenyl-trichloroacetoimidochloride or N-(1',2',2',2'-tetrachloro-ethylidene)-2,3,5,6-tetrachloro-aniline of M.P. 112–114° C. (from benzine). Yield: 93% of the theory.

EXAMPLE 10

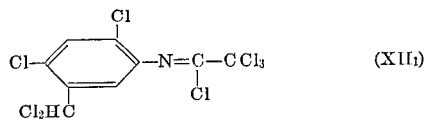
(XII₁)

Chlorination of N-(2',2',2'-trichloro - ethylidene)-2,4-dichloro-5-methyl-aniline for three hours at 200° C. yields 2,4-dichloro-5-dichloromethyl - phenyl - trichloroacetoimidochloride, or N-(1',2',2',2' - tetrachloro-ethylidene)-2,4-dichloro-5-dichlormethyl-aniline as a pale yellow oil of B.P. 163–173° C./0.1 mm. Hg. Yield: 75% of the theory.

EXAMPLE 11

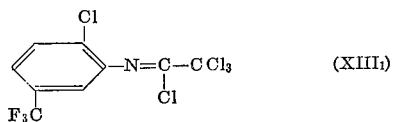
(XIII₁)

Chlorination of N-(2',2',2'-trichloro-ethylidene)-2-chloro-5-trifluoromethyl-aniline for three hours at 200° C. yields 2-chloro-5-trifluoromethyl - phenyl - -trichloroacetoimidochloride or N-(1',2',2',2'-tetrachloro - ethylidene)-2-chloro-5-trifluoromethyl-aniline as a pale yellow oil of B.P. 94–96° C./0.1 mm. Hg. Yield: 82% of the theory.

EXAMPLE 12

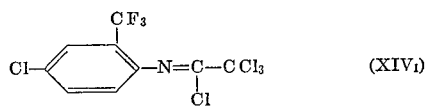
(XIV₁)

Chlorination of N-(2',2',2'-trichloro-ethylidene)-2-trifluoromethyl-4-chloro-aniline for three hours at 200° C. yields 2-trifluoromethyl - 4 - chloro-phenyl-trichloroacetoimidochloride or N-(1',2',2',2' - tetrachloro - ethylidene)-2-trifluoromethyl-4-chloro-aniline as a pale yellow oil of B.P. 85–86° C./0.05 mm. Hg. refractive index $n_D^{20}$: 1.5300. Yield: 93% of the theory.

EXAMPLE 13

Using corresponding molar amounts of each of the following N-(2,2,2-trichloro - ethylidene)-anilines, respectively, with chlorine, in accordance with the procedure of Example 1 [(a) to (f)] and of Example 10 [(g)], as the case may be:

(a) N-(2',2',2'-trichloro-ethylidene)-2,4-difluoro-aniline;
(b) N-(2',2',2'-trichloro-ethylidene)-3-fluoro-4-bromo-5-chloro-aniline;
(c) N-(2',2',2'-trichloro-ethylidene)-4-isopropyl-aniline;
(d) N-(2',2',2'-trichloro-ethylidene)-3-cyano-aniline;
(e) N-(2',2',2'-trichloro-ethylidene)-2,4-bis(trifluoromethyl)-aniline;
(f) N-(2',2',2'-trichloro-ethylidene)-2,6-dichloro-3-cyano-4-(trifluoromethyl)-5-n-butyl-aniline; and
(g) N-(2',2',2'-trichloro-ethylidene)-2-chloro-3,5-diethyl-aniline;

the corresponding final compounds are produced:

(a') N-(1',2',2',2'-tetrachloro-ethylidene)-2,4-difluoro-aniline;
(b') N-(1',2',2',2'-tetrachloro-ethylidene)-3-fluoro-4-bromo-5-chloro-aniline;
(c') N-(1',2',2',2'-tetrachloro-ethylidene)-4-isopropyl-aniline;
(d') N-(1',2',2',2'-tetrachloro-ethylidene)-3-cyano-aniline;
(e') N-(1',2',2',2'-tetrachloro-ethylidene)-2,4,bis-(trifluoromethyl)-aniline;
(f') N-(1',2',2',2'-tetrachloro-ethylidene)-2,6-dichloro-3-cyano-4-(trifluoromethyl)-5-n-butyl-aniline; and (g') N-(1'2',2',2' - tetrachloro - ethylidene) - 2,4,6 - trichloro - 3,5-bis - (1'',1'',2'',2'',2'' - pentachloroethyl)-aniline.

Advantageously, in accordance with the present invention, in foregoing formulae:
Hal represents chloro, bromo and/or fluoro;
R represents lower alkyl such as methyl, ethyl, n-propyl, isopropyl, n-butyl, isobutyl, sec.-butyl, tert.-butyl, and the like, especially alkyl having 1–4 atoms;
chloro-substituted lower alkyl such as mono, di, tri and poly chloro-substituted methyl to tert.-butyl inclusive, as noted above, and the like, especially mono to nona chloro-alkyl having 1–4 carbon atoms, more especially mono to tri chloromethyl, and particularly dichloromethyl; and/or
cyano, i.e., nitrile (—CN);

$x$ is a whole number from 0 to 5, especially 1 to 5;
$y$ is a whole number from 0 to 2, especially 0 to 1; and
$z$ is a whole number from 0 to 2, especially 0 to 1;
With the proviso that the sum of $x$ and $y$ is at least 1 and at most 5 and that the sum of $x$, $y$ and $z$ is at most 5;
R' correspondingly represents lower alkyl such as methyl to tert.-butyl inclusive, as noted above for R, and the like, especially alkyl having 1–4 carbon atoms; and/or cyano, i.e., nitrile (—CN); and $m$ is correspondingly a whole number from 0 to 5, especially 1–5 or a whole number at most equal to $x$;
With the further proviso that the sum of $m$ and $y$ is correspondingly at least 1 and at most 5 and that the sum of $m$, $y$ and $z$ is correspondingly at most 5.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Process for the production of N-(1,2,2,2-tetrachloro-ethylidene)-anilines having the formula

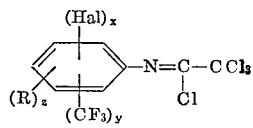

in which each Hal respectively is selected from the group consisting of chloro, bromo and fluoro, each R respectively is selected from the group consisting of lower alkyl, chloro-substituted lower alkyl and cyano, $x$ is a whole number from 0 to 5, $y$ is a whole number from 0 to 2, and $z$ is a whole number from 0 to 2, with the proviso that the sum of $x$ and $y$ is at least 1 and at most 5 and that the sum of $x$, $y$ and $z$ is at most 5, which comprises reacting N-(2,2,2-trichloroethylidene)-aniline having the formula

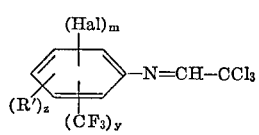

in which Hal, $y$ and $z$ are the same as defined above, each R' respectively is correspondingly selected from the group consisting of lower alkyl and cyano, and $m$ is a whole number from 0 to 5 at most equal to $x$, with the further proviso that the sum of $m$ and $y$ is correspondingly at least 1 and at most 5 and that the sum of $m$, $y$ and $z$ is correspondingly at most 5, with chlorine at a temperature substantially between about 80 and 250° C., to form the corresponding chlorinated aniline.

2. Process according to claim 1 wherein said temperature is above the melting point of the corresponding N-(2,2,2-trichloro-ethylidene)-aniline used.

3. Process according to claim 1 wherein said reacting is carried out in the presence of an inert organic solvent.

4. Process according to claim 3 wherein said inert organic solvent is selected from the group consisting of chlorinated aliphatic hydrocarbons, chlorinated aromatic hydrocarbons, and mixtures thereof.

5. Process according to claim 1 wherein said reacting is carried out in the presence of a member selected from the group consisting of a Lewis acid and iodine as catalyst.

6. Process according to claim 5 wherein said catalyst is selected from the group consisting of iron (III) chloride, anhydrous aluminum chloride, iodine, boron trifluoride, and antimony trichloride.

7. Process according to claim 5 wherein said catalyst is present in an amount substantially between about 0.01 and 5% by weight based on the starting aniline used.

8. Process according to claim 1 wherein each Hal respectively is selected from the group consisting of chloro, bromo and fluoro, each R respectively is selected from the group consisting of alkyl having 1 to 4 carbon atoms, chloro-substituted alkyl having 1 to 4 carbon atoms and cyano, $x$ is a whole number from 0 to 5, $y$ is a whole number from 0 to 1, $z$ is a whole number from 0 to 1, with the proviso that the sum of $x$ and $y$ is at least 1 and at most 5 and that the sum of $x$, $y$ and $z$ is at most 5, each R' respectively is correspondingly selected from the group consisting of alkyl having 1–4 carbon atoms and cyano, and $m$ is a whole number from 0 to 5 at most equal to $x$, with the further proviso that the sum of $m$ and $y$ is correspondingly at least 1 and at most 5 and that the sum of $m$, $y$ and $z$ is correspondingly at most 5.

9. Process according to claim 1 wherein each Hal respectively is selected from the group consisting of chloro and bromo, R is selected from the group consisting of alkyl having 1 to 4 carbon atoms and chloro-substituted alkyl having 1 to 4 carbon atoms, $x$ is a whole number from 1 to 5, $y$ is a whole number from 0 to 1, $z$ is a whole number from 0 to 1, with the proviso that the sum of $x$ and $y$ is at most 5 and that the sum of $x$, $y$ and $z$ is at most 5, R' is alkyl having 1 to 4 carbon atoms, and $m$ is a whole number from 1 to 5 at most equal to $x$, with the further proviso that the sum of $m$ and $y$ is correspondingly at most 5 and that the sum of $m$, $y$ and $z$ is correspondingly at most 5.

10. Process according to claim 1 wherein Hal is selected from the group consisting of chloro and bromo, R is dichloromethyl, $x$ is a whole number from 1 to 5, $y$ is a whole number from 0 to 1, $z$ is a whole number from 0 to 1, with the proviso that the sum of $x$ and $y$ is at most 5 and that the sum of $x$, $y$ and $z$ is at most 5, R' is methyl, and $m$ is correspondingly a whole number from 1 to 5, with the further proviso that the sum of $m$ and $y$ is correspondingly at most 5 and that the sum of $m$, $y$ and $z$ is correspondingly at most 5.

11. Process according to claim 1 wherein Hal is chloro, $x$ is a whole number from 1 to 5, $y$ and $z$ are 0, and $m$ is a whole number from 0 to 5 at most equal to $x$.

12. Process according to claim 1 wherein Hal is chloro, $x$ is a whole number from 1 to 5, $y$ and $z$ are 0, and $m$ is correspondingly a whole number from 1 to 5.

13. Process according to claim 1 wherein at least one Hal is chloro and at least one Hal is bromo and any remaining Hal groups are selected from the group consisting of chloro and bromo, $x$ is a whole number from 2 to 5, $y$ and $z$ are 0, and $m$ is correspondingly a whole number from 2 to 5.

14. Process according to claim 1 wherein Hal is chloro, R is dichloromethyl, $x$ is a whole number from 1 to 4, $y$ is 0, $z$ is 1, R′ is methyl, and $m$ is a whole number from 1 to 4 at most equal to $x$.

15. Process according to claim 1 wherein Hal is chloro, $x$ is a whole number from 1 to 4, $y$ is 1, $z$ is 0, and $m$ is correspondingly a whole number from 1 to 4.

References Cited

UNITED STATES PATENTS 3,325,543  6/1967  Degener et al. _____ 260—566

BERNARD HELFIN, Primary Examiner

G. A. SCHWARTZ, Assistant Examiner

U.S. Cl. X.R.

260——465, 999